(12) United States Patent
Fujishiro et al.

(10) Patent No.: US 10,555,367 B2
(45) Date of Patent: Feb. 4, 2020

(54) RADIO TERMINAL

(71) Applicant: KYOCERA CORPORATION, Kyoto (JP)

(72) Inventors: Masato Fujishiro, Yokohama (JP); Hiroyuki Adachi, Kawasaki (JP)

(73) Assignee: KYOCERA Corporation, Kyoto (JP)

(*) Notice: Subject to any disclaimer, the term of this patent is extended or adjusted under 35 U.S.C. 154(b) by 134 days.

(21) Appl. No.: 15/553,473

(22) PCT Filed: Feb. 26, 2016

(86) PCT No.: PCT/JP2016/055885
§ 371 (c)(1),
(2) Date: Aug. 24, 2017

(87) PCT Pub. No.: WO2016/136960
PCT Pub. Date: Sep. 1, 2016

(65) Prior Publication Data
US 2018/0020502 A1 Jan. 18, 2018

(30) Foreign Application Priority Data

Feb. 27, 2015 (JP) ................................. 2015-038927

(51) Int. Cl.
H04W 24/02 (2009.01)
H04W 72/04 (2009.01)
H04W 76/28 (2018.01)
H04L 5/00 (2006.01)
H04W 52/02 (2009.01)

(52) U.S. Cl.
CPC ........... *H04W 76/28* (2018.02); *H04L 5/0096* (2013.01); *H04W 24/02* (2013.01); *H04W 72/042* (2013.01); *H04W 52/0209* (2013.01); *H04W 52/0216* (2013.01); *Y02D 70/1242* (2018.01); *Y02D 70/1262* (2018.01); *Y02D 70/21* (2018.01); *Y02D 70/24* (2018.01)

(58) Field of Classification Search
CPC . H04W 36/16; H04W 52/02; H04W 74/0833; H04L 12/26
USPC .................................. 370/252–339; 455/436
See application file for complete search history.

(56) References Cited

U.S. PATENT DOCUMENTS

| 2010/0110897 | A1* | 5/2010 | Chun | .................. | H04L 43/0811 370/241 |
| 2012/0069782 | A1* | 3/2012 | Kuo | ..................... | H04W 76/28 370/311 |
| 2015/0023238 | A1 | 1/2015 | Fukuta et al. | | |

OTHER PUBLICATIONS

International Search Report issued in PCT/JP2016/055885; dated May 17, 2016.

(Continued)

*Primary Examiner* — Iqbal Zaidi
(74) *Attorney, Agent, or Firm* — Studebaker & Brackett PC

(57) ABSTRACT

A base station comprises a transmitter configured to transmit, to a user terminal, information indicating at least any one of a first DRX cycle, a second DRX cycle, and a third DRX cycle. The DRX cycle indicates a cycle during which a user terminal discontinuously monitors a downlink control channel transmitted from a base station. The second DRX cycle has a cycle longer than the first DRX cycle. The third DRX cycle has a cycle longer than the second DRX cycle.

3 Claims, 11 Drawing Sheets

(56) References Cited

OTHER PUBLICATIONS

Qualcomm Incorporated; "New WI Proposal: RAN enhancements for extended DRX in LTE"; 3GPP TSG RAN Meeting #66; RP-141994; Dec. 8-11, 2014; pp. 1-6; Maui, Hawaii, USA.
InterDigital; "Supporting Extended DRX in RRC_IDLE mode"; 3GPP TSG RAN WG2 Meeting #82; R2-131935; May 20-24, 2013; pp. 1-5; Fukuoka, Japan.

* cited by examiner

FIG. 5

CONVENTIONAL DRX CONFIGURATION INFORMATION

```
DRX-Config ::=                       CHOICE {
    release                              NULL,
    setup                                SEQUENCE {
        onDurationTimer                      ENUMERATED {
                                                 psf1, psf2, psf3, psf4, psf5, psf6,
                                                 psf8, psf10, psf20, psf30, psf40,
                                                 psf50, psf60, psf80, psf100,
                                                 psf200},
        drx-InactivityTimer                  ENUMERATED {
                                                 psf1, psf2, psf3, psf4, psf5, psf6,
                                                 psf8, psf10, psf20, psf30, psf40,
                                                 psf50, psf60, psf80, psf100,
                                                 psf200, psf300, psf500, psf750,
                                                 psf1280, psf1920, psf2560, psf0-v1020,
                                                 spare9, spare8, spare7, spare6,
                                                 spare5, spare4, spare3, spare2,
                                                 spare1},
        drx-RetransmissionTimer              ENUMERATED {
                                                 psf1, psf2, psf4, psf6, psf8, psf16,
                                                 psf24, psf33},
        longDRX-CycleStartOffset             CHOICE {
            sf10                                 INTEGER(0..9),
            sf20                                 INTEGER(0..19),
            sf32                                 INTEGER(0..31),
            sf40                                 INTEGER(0..39),
            sf64                                 INTEGER(0..63),
            sf80                                 INTEGER(0..79),
            sf128                                INTEGER(0..127),
            sf160                                INTEGER(0..159),
            sf256                                INTEGER(0..255),
            sf320                                INTEGER(0..319),
            sf512                                INTEGER(0..511),
            sf640                                INTEGER(0..639),
            sf1024                               INTEGER(0..1023),
            sf1280                               INTEGER(0..1279),
            sf2048                               INTEGER(0..2047),
            sf2560                               INTEGER(0..2559)
        },
        shortDRX                             SEQUENCE {
            shortDRX-Cycle                       ENUMERATED {
                                                     sf2, sf5, sf8, sf10, sf16, sf20,
                                                     sf32, sf40, sf64, sf80, sf128, sf160,
                                                     sf256, sf320, sf512, sf640},
            drxShortCycleTimer                   INTEGER (1..16)
        }   OPTIONAL                                             -- Need OR
    }
}

DRX-Config-v13xx ::=                 SEQUENCE {
    ExtendedDRX                          SEQUENCE {
        extendedDRX-Cycle                    ENUMERATED {sf2560, ... , sf10240, ... }
    }
}
```

EXTENDED DRX CONFIGURATION INFORMATION

FIG. 8

```
-Config-v13xx ::=              SEQUENCE {
ExtendedDRX                       SEQUENCE {
    extendedDRX-Cycle                ENUMERATED    {sf2560, ... , sf10240, ... }
    TIMER or COUNTER
}
```

THRESHOLD VALUE INFORMATION

FIG. 11

| INDEX | LCID VALUES |
|---|---|
| 00000 | CCCH |
| 00001-01010 | IDENTITY OF THE LOGICAL CHANNEL |
| 01011-11010 | RESERVED |
| 11011 | ACTIVATION/DEACTIVATION |
| 11100 | UE CONTENTION RESOLUTION IDENTITY |
| 11101 | TIMING ADVANCE COMMAND |
| 11110 | DRX COMMAND |
| 11111 | PADDING | ical field

The present invention relates to a radio terminal used in a mobile communication system.

BACKGROUND ART

In 3GPP (3rd Generation Partnership Project), which is a project aiming to standardize a mobile communication system, a discontinuous reception (DRX) is prescribed as an intermittent reception technique to reduce power consumption of a radio terminal. A radio terminal in a DRX state in a connected mode intermittently monitors a downlink control channel, based on DRX configuration information received from a base station. A cycle in which the downlink control channel is monitored is referred to as "DRX cycle". Furthermore, monitoring duration arising in each DRX cycle is referred to as "On duration".

In recent years, machine-type communication (MTC) in which a radio terminal performs communication without human intervention in a mobile communication system has attracted attention. From such a background, an ongoing discussion is a new introduction of an extended DRX cycle longer than a conventional DRX cycle to further reduce power consumption (for example, see Non Patent Document 1). The DRX using the extended DRX cycle is referred to as "extended DRX".

Furthermore, the existing DRX includes a long DRX using a long DRX cycle and a short DRX using a short DRX cycle. When a DRX is configured to a radio terminal, in the 3GPP specifications, a long DRX is a mandatory function and a short DRX is an optional function.

PRIOR ART DOCUMENT

Non-Patent Document

Non Patent Document 1: 3GPP contribution "RP-141994"

SUMMARY

A radio terminal according to a first aspect discontinuously monitors, in a connected mode, a downlink control channel, in either a DRX state or an extended DRX state having a DRX cycle longer than the DRX state. The DRX state including a long DRX state and a short DRX state. The radio terminal comprises a controller configured to transition from the long DRX state or the short DRX state to the extended DRX state in the long DRX state or the short DRX state, when a period during which a DRX cycle not receiving a control signal addressed to the radio terminal continues or the number of times of DRX cycles not receiving a control signal addressed to the radio terminal exceeds a first threshold value.

A radio terminal according to a second aspect discontinuously monitors, in a connected mode, a downlink control channel, in either a DRX state or an extended DRX state having a DRX cycle longer than the DRX state. The radio terminal comprises a controller configured to transition from the DRX state to the extended DRX state in the DRX state, when an MAC control element to instruct transition to the extended DRX state is received from a base station.

A radio terminal according to a third aspect discontinuously monitors, in a connected mode, a downlink control channel, in either a DRX state or an extended DRX state having a DRX cycle longer than the DRX state. The user terminal comprises a controller configured to transition, in the extended DRX state, to the DRX state upon data transmission to a base station or data reception from the base station. The DRX state including a long DRX state and a short DRX state. A DRX state applicable when having transitioned to the DRX state upon the data transmission is different from a DRX state applicable when having transitioned to the DRX state upon the data reception.

A radio terminal according to a fourth aspect discontinuously monitors, in a connected mode, a downlink control channel, in either a DRX state or an extended DRX state having a DRX cycle longer than the DRX state. The DRX state includes a long DRX state and a short DRX state. The radio terminal comprises a controller configured to transition, in the short DRX state, from the short DRX state to the extended DRX state, without transitioning from the short DRX state to the long DRX state.

A radio terminal according to a fifth aspect discontinuously monitors, in a connected mode, a downlink control channel, in either a DRX state or an extended DRX state having a DRX cycle longer than the DRX state. The DRX state includes a long DRX state and a short DRX state. When configuration information for the extended DRX state and configuration information for the short DRX state are both provided, the configuration information for the short DRX state is ignored.

A radio terminal according to a sixth aspect discontinuously monitors, in an idle mode, a downlink control channel, in either a DRX state or an extended DRX state having a paging cycle longer than the DRX state. The radio terminal comprises a controller configured to transition from the DRX state to the extended DRX state, if, in the DRX state, a period during which a paging cycle not receiving a control signal addressed to the radio terminal continues or the number of times of paging cycles not receiving a control signal addressed to the radio terminal exceeds a first threshold value.

A base station according to a seventh aspect comprises a transmitter configured to transmit, to a user terminal, information indicating at least any one of a first DRX cycle, a second DRX cycle, and a third DRX cycle. The DRX cycle indicates a cycle during which a user terminal discontinuously monitors a downlink control channel transmitted from a base station. The second DRX cycle has a cycle longer than the first DRX cycle. The third DRX cycle has a cycle longer than the second DRX cycle.

A user terminal according to an eighth aspect comprises a controller configured to execute, in an RRC idle state, if an extended DRX cycle is configured, a process of monitoring a paging message in accordance with the extended DRX cycle.

BRIEF DESCRIPTION OF THE DRAWINGS

FIG. 5 is a diagram illustrating an example of a DRX parameter in the connected mode.
FIG. 8 is a diagram illustrating configuration information of an extended DRX according to a first embodiment.

FIG. 11 is a diagram for describing an "eDRX Command MAC control element" according to a second embodiment.

DESCRIPTION OF THE EMBODIMENT

[Overview of Embodiments]

Figure 1:
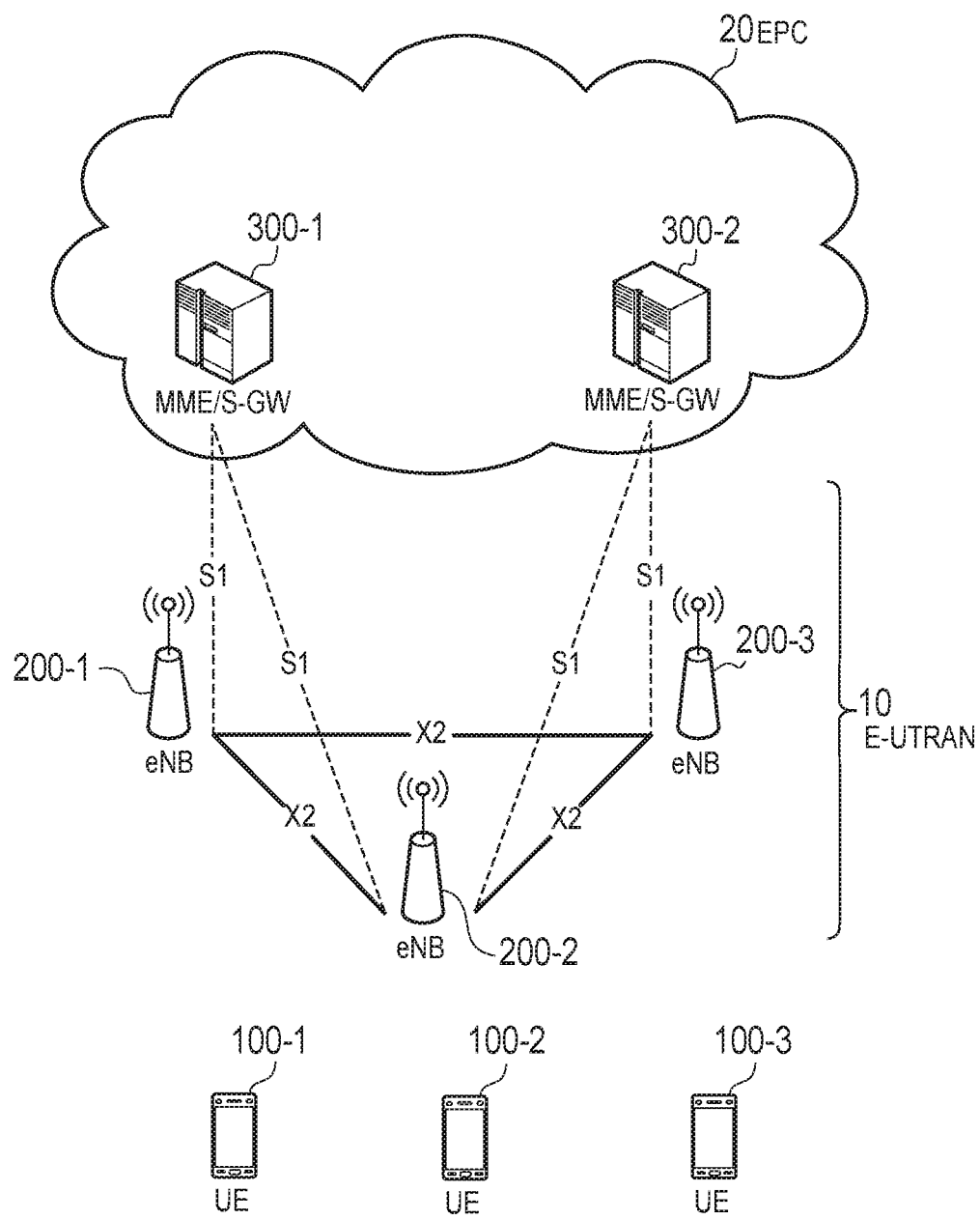
FIG. 1 is a configuration diagram of an LTE system.

In spite of the forgoing, in the current 3GPP specification, a state transition rule between an extended DRX state and a conventional DRX state is not stipulated, and hence, a relationship between the extended DRX and the conventional DRX is indefinite.

Therefore, the present embodiment provides a radio terminal that enables an appropriate state transition between the extended DRX state and the conventional DRX state.

A radio terminal according to a first embodiment discontinuously monitors, in a connected mode, a downlink control channel, in either a DRX state or an extended DRX state having a DRX cycle longer than the DRX state. The DRX state includes a long DRX state and a short DRX state. The radio terminal comprises a controller configured to transition from the long DRX state or the short DRX state to the extended DRX state in the long DRX state or the short DRX state, when a period during which a DRX cycle not receiving a control signal addressed to the radio terminal continues or the number of times of DRX cycles not receiving a control signal addressed to the radio terminal exceeds a first threshold value.

In the first embodiment, the controller sets the first threshold value, based on threshold value information received from a base station.

In the first embodiment, the controller transitions from the extended DRX state to the long DRX state in the extended DRX state, when a period during which a DRX cycle not receiving a control signal addressed to the radio terminal continues or the number of times of DRX cycles not receiving a control signal addressed to the radio terminal exceeds a second threshold value.

A radio terminal according to a second aspect discontinuously monitors, in a connected mode, a downlink control channel, in either a DRX state or an extended DRX state having a DRX cycle longer than the DRX state. The radio terminal comprises a controller configured to transition from the DRX state to the extended DRX state in the DRX state, when an MAC control element to instruct transition to the extended DRX state is received from a base station.

In the second embodiment, the DRX state includes a long DRX state. The controller transitions from the long DRX state to the extended DRX state in the long DRX state, when the MAC control element is received from the base station.

In the second embodiment, the DRX state further includes a short DRX state. The controller transitions to the extended DRX state without transitioning to the short DRX state even if having configuration information for the short DRX state in the long DRX state, when the MAC control element is received from the base station.

A radio terminal according to a third embodiment discontinuously monitors, in a connected mode, a downlink control channel, in either a DRX state or an extended DRX state having a DRX cycle longer than the DRX state. The radio terminal comprises a controller configured to transition, in the extended DRX state, to the DRX state upon data transmission to a base station or data reception from the base station. The DRX state includes a long DRX state and a short DRX state. A DRX state applicable when having transitioned to the DRX state upon the data transmission is different from a DRX state applicable when having transitioned to the DRX state upon the data reception.

In the third embodiment, when having transitioned to the long DRX state upon the data reception, the controller prohibits transition to the short DRX state even if having configuration information for the short DRX state.

In the third embodiment, when having transitioned to the long DRX state upon the data transmission, the controller enables transition to the short DRX state if having the configuration information for the short DRX state.

A radio terminal according to a fourth embodiment discontinuously monitors, in a connected mode, a downlink control channel, in either a DRX state or an extended DRX state having a DRX cycle longer than the DRX state. The DRX state includes a long DRX state and a short DRX state. The radio terminal comprises a controller configured to transition, in the short DRX state, from the short DRX state to the extended DRX state, without transitioning from the short DRX state to the long DRX state.

A radio terminal according to a fifth embodiment discontinuously monitors, in a connected mode, a downlink control channel, in either a DRX state or an extended DRX state having a DRX cycle longer than the DRX state. The DRX state includes a long DRX state and a short DRX state. When configuration information for the extended DRX state and configuration information for the short DRX state are both provided, the configuration information for the short DRX state is ignored.

A radio terminal according to other embodiments discontinuously monitors, in an idle mode, a downlink control channel, in either a DRX state or an extended DRX state having a paging cycle longer than the DRX state. The radio terminal comprises a controller configured to transition from the DRX state to the extended DRX state in the DRX state, when a period during which a paging cycle not receiving a control signal addressed to the radio terminal continues or the number of times of paging cycles not receiving a control signal addressed to the radio terminal exceeds a first threshold value.

A base station according to one embodiment comprises a transmitter configured to transmit, to a user terminal, information indicating at least any one of a first DRX cycle, a second DRX cycle, and a third DRX cycle. The DRX cycle indicates a cycle during which a user terminal discontinuously monitors a downlink control channel transmitted from a base station. The second DRX cycle has a cycle longer than the first DRX cycle. The third DRX cycle has a cycle longer than the second DRX cycle.

A user terminal according to one embodiment comprises a controller configured to execute, in an RRC idle state, when an extended DRX cycle is configured, a process of monitoring a paging message in accordance with the extended DRX cycle.

[First Embodiment]

(Mobile Communication System)

Hereinafter, an LTE system that is a mobile communication system according to a first embodiment will be described. FIG. 1 is a diagram illustrating a configuration of the LTE system.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs200 are connected mutually via an X2 interface. Configuration of the eNB200 will be described later.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a network.

Figure 2:
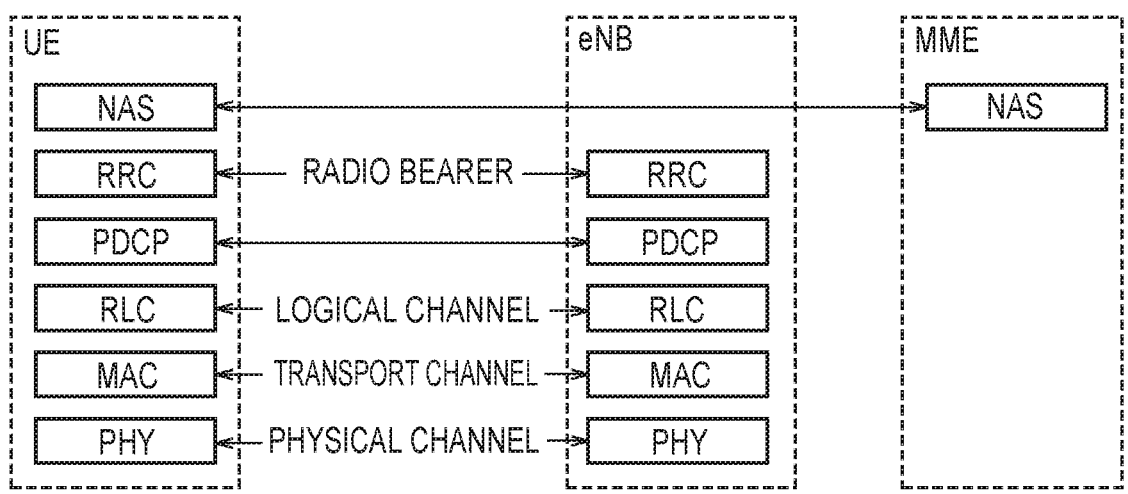
FIG. 2 is a protocol stack diagram of a radio interface.

FIG. 2 is a protocol stack diagram of a radio interface in the LTE system. As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode (connected mode), otherwise the UE 100 is in an RRC idle mode (idle mode).

A NAS (Non-Access Stratum) layer positioned above the RRC layer performs a session management, a mobility management and the like.

Figure 3:
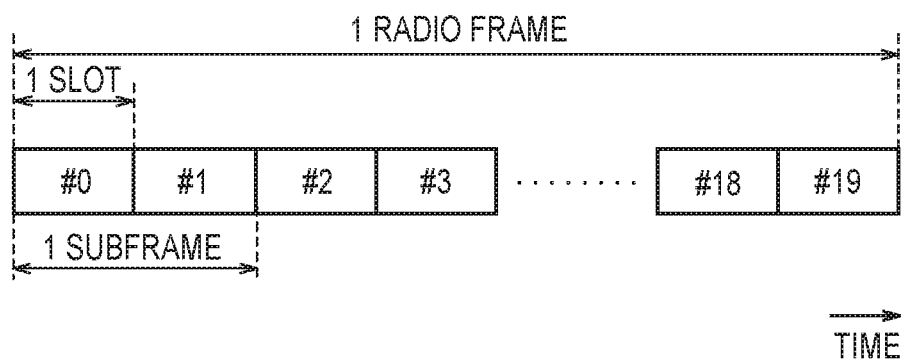
FIG. 3 is a configuration diagram of a radio frame.

FIG. 3 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 3, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a control region used as a physical downlink control channel (PDCCH) for mainly transmitting a control signal. The detail of the PDCCH will be described later. Furthermore, the other portion of each subframe is a region available as a physical downlink shared channel (PDSCH) for mainly transmitting downlink data.

In the uplink, both ends in the frequency direction of each subframe are control regions used as a physical uplink control channel (PUCCH) for mainly transmitting an uplink control signal. Furthermore, the other portion of each subframe is a region available as a physical uplink shared channel (PUSCH) for mainly transmitting uplink data.

(DRX in Connected Mode)

Figure 4:
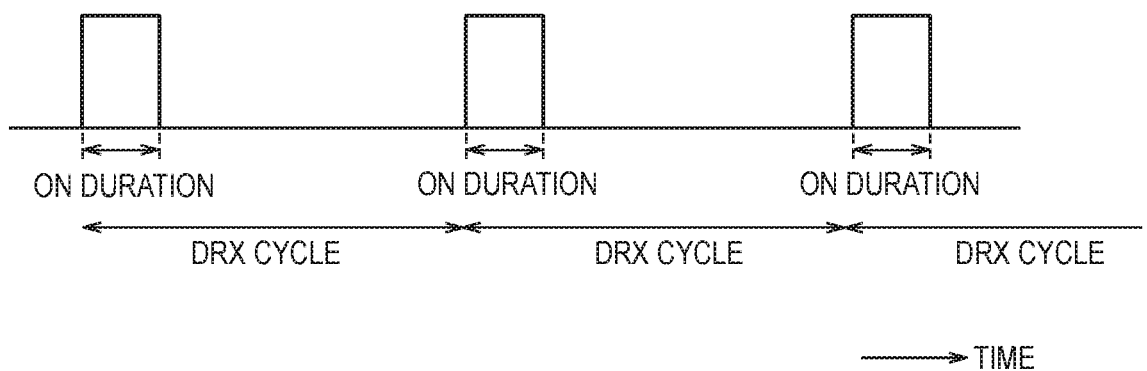
FIG. 4 is a diagram illustrating an operation of a UE in a DRX state in a connected mode.

A DRX in the connected mode will be described, below. FIG. 4 is a diagram illustrating an operation of the UE 100 in a DRX state in the connected mode. FIG. 5 is a diagram illustrating an example of a DRX parameter in the connected mode.

As illustrated in FIG. 4, the UE 100 in the DRX state in the connected mode intermittently monitors the PDCCH. A cycle in which the PDCCH is monitored is referred to as "DRX cycle". Furthermore, monitoring duration arising in each DRX cycle is referred to as "On duration". The "On duration" is also referred to as "wake-up duration". A duration during which the PDCCH does not need to be monitored is also referred to as "sleep duration" (or "Opportunity for DRX").

Downlink data is transmitted via the PDSCH, and scheduling information of the PDSCH is included in the PDCCH. Upon detecting, in "On duration", scheduling information via the PDCCH, the UE 100 can receive data designated by the scheduling information.

As illustrated in FIG. 5, a conventional DRX cycle includes a short DRX cycle and a long DRX cycle. The duration length of the short DRX cycle and the duration length of the long DRX cycle are the same in "On duration", but different in the sleep duration. For example, the "On duration" can be set from 1 ms to 200 ms by an "On duration timer". The long DRX cycle (and offset time) is configured by "longDRX-CycleStartOffset", and the short DRX cycle is configured by "shortDRX-Cycle". It is noted that if a DRX is configured, in the 3GPP specifications, a long DRX is a mandatory function and a short DRX is an optional function. Therefore, the short DRX cycle is sometimes not configured in the UE 100.

The DRX is controlled based on a plurality of timers, as described below.

"drx-InactivityTimer": the number of consecutive subframes (PDCCH subframes) after correctly decoding the PDCCH indicating uplink (UL) or downlink (DL) user data scheduling "HARQ RTT Timer": the minimum number of subframes until DL HARQ retransmission is performed "drx-RetransmissionTimer": the duration used for retransmission Upon receiving new DL data while in "On duration", the UE 100 activates the "drx-InactivityTimer". Simultaneously, the "HARQ RTT Timer" is activated. If the DL data is not correctly decoded, the "drx-RetransmissionTimer" is activated at the same time the "HARQ RTT Timer" expires. If the DL data is correctly decoded, in response to the retransmission of DL data, the UE 100 stops the "drx-RetransmissionTimer". Then, the sleep duration is started at the same time the "drx-InactivityTimer" expires.

It is noted that a state in which the "On duration timer", the "drx-InactivityTimer", and the "drx-RetransmissionTimer" are in operation, is referred to as "Active state". In the "Active state", the UE 100 monitors the PDCCH. A DRX state which is not in the "Active state" is referred to as "Inactive state".

Next, a state transition between a short DRX state (a state where short DRX cycle is used) and a long DRX state (a state where long DRX cycle is used) in a case where short DRX cycle is configured will be described. Basically, the UE 100 starts from the short DRX and transitions to the long DRX state upon elapsing of a time duration set by a "drxShortCycleTimer".

At the time point when the DL data is correctly decoded, the UE 100 activates the "drxShortCycleTimer". If new data is received during the operation of the "drxShortCycleTimer", the UE 100 restarts the "drxShortCycleTimer" at the time point when the data is correctly decoded. Meanwhile, if new data is not received before the "drxShortCycleTimer" expires, state transition from the short DRX to the long DRX occurs. Then, if new data is received after the transition to the long DRX, state transition from the long DRX to the short DRX occurs again.

Configuration information (the "On duration", various types of timers, the long DRX cycle, the short DRX cycle, and the like) including each parameter of the DRX described above, is configured in the UE 100 by "DRX-Config", which is an information element in a dedicated RRC message.

In the first embodiment, an extended DRX cycle longer than the conventional DRX cycle is newly introduced to support mainly machine-type communication (MTC). In the example of FIG. 5, the extended DRX cycle has a time length of 2560 or more subframes. If the eNB 200 configures the extended DRX in the UE 100, it is assumed that the eNB 200 considers the UE 100 as an MTC terminal, that is, a non-moving radio terminal.

The extended DRX configuration information is defined as an information element different from the conventional "DRX-Config". That is, "DRX-Config-v13xx", which is the configuration information of the extended DRX, is different from the "DRX-Config", which is the configuration information of the conventional DRX. The "DRX-Config-v13xx" may include parameters such as the "On duration" and various types of timers, separately from the "DRX-Config".

(Basic DRX State Transition)

Figure 6:
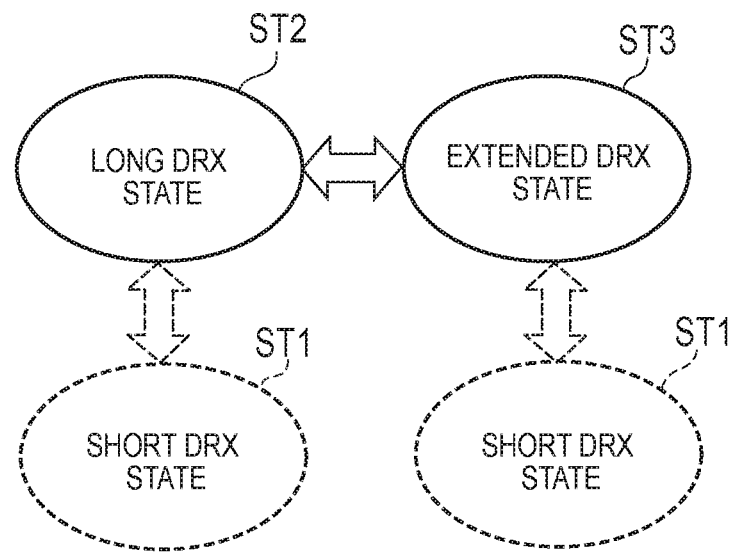
FIG. 6 is a state transition diagram illustrating a basic DRX state transition.

A basic DRX state transition will be described, below. FIG. 6 is a state transition diagram illustrating the basic DRX state transition.

Here, a case is assumed where both the long DRX cycle and the extended DRX cycle are configured in the UE 100. The short DRX cycle may be configured in the UE 100, or may not need to be configured in the UE 100.

Hereinafter, the DRX state according to the short DRX cycle is referred to as "short DRX state ST1". The DRX state according to the long DRX cycle is referred to as "long DRX state ST2". The DRX state according to the extended DRX cycle is referred to as "extended DRX state ST3".

The UE 100 has DRX configuration information (DRX-Config) for the conventional DRX state and DRX configuration information (DRX-Config-v13xx) for the extended DRX state. As described above, the "DRX-Config" and the "DRX-Config-v13xx" are transmitted and configured from the eNB 200 to the UE 100 by the individual RRC message.

As illustrated in FIG. 6, the UE 100 in which the short DRX cycle is configured transitions between the short DRX state ST1 and the long DRX state ST2. Furthermore, the UE 100 in which the short DRX cycle is configured transitions between the short DRX state ST1 and the extended DRX state ST3. The conventional state transition rule is applicable to the state transition between the short DRX state ST1 and the long DRX state ST2. The conventional state transition rule may be used for the state transition between the short DRX state ST1 and the extended DRX state ST3.

Currently, the state transition rule is not stipulated for the state transition between the long DRX state ST2 and the extended DRX state ST3. In the first embodiment, the state transition between the long DRX state ST2 and the extended DRX state ST3, particularly, the state transition from the long DRX state ST2 to the extended DRX state ST3 will be mainly described.

(Base Station)

Figure 7:
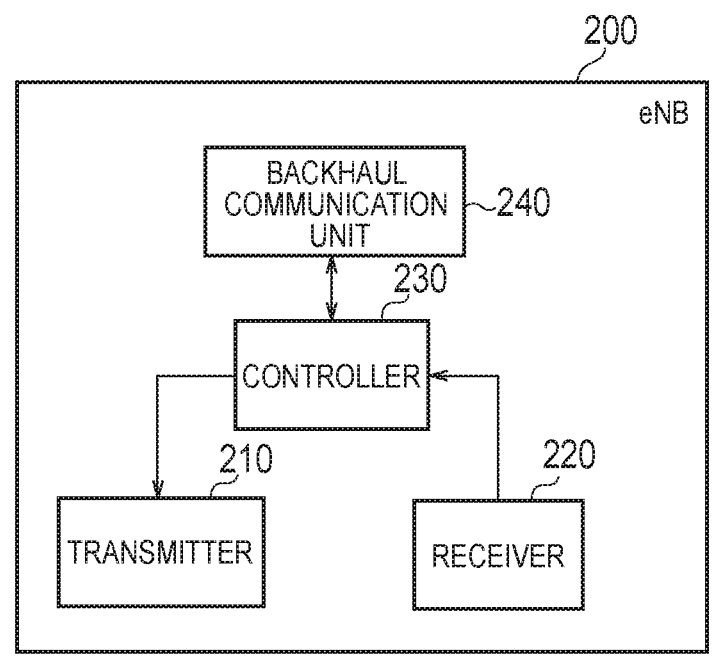
FIG. 7 is a block diagram of an eNB.

The configuration of the eNB 200 (base station) according to the first embodiment will be described, below. FIG. 7 is a block diagram of the eNB 200. As illustrated in FIG. 7, the eNB 200 includes a transmitter 210, a receiver 220, a controller 230, and a backhaul communication unit 240.

The transmitter 210 performs various transmissions under the control of the controller 230. The transmitter 210 includes an antenna and a transmitting machine. The transmitting machine converts a baseband signal (transmission signal) output from the controller 230 into a radio signal and transmits it from the antenna.

The receiver 220 performs various types of reception under the control of the controller 230. The receiver 220 includes an antenna and a receiving machine. The receiving machine converts a radio signal received by the antenna into a baseband signal (reception signal) and outputs it to the controller 230.

The controller 230 performs various controls in the eNB 200. The controller 230 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor executes various processes described later and various communication protocols described above.

The backhaul communication unit 240 is connected to an adjacent eNB 200 via the X2 interface, and is connected to the MME/S-GW 300 via an S1 interface. The backhaul communication unit 240 is used for communication performed on the X2 interface, communication performed on the S1 interface, and the like.

In the eNB 200 thus configured, the backhaul communication unit 240 receives an "Expected UE Behaviour IE" over the S1 interface. The "Expected UE Behaviour IE" includes an "Expected HO Interval", an "Expected Activity Period", an "Expected Idle Period", and a "source of ue activity behaviour information". The "Expected HO Interval" is an expected value of the handover interval of the UE 100. The "Expected Activity Period" is an expected value of the active period of the UE 100. The "Expected Idle Period" is an expected value of the idle period of the UE 100. The "source of ue activity behaviour information" is information on the calculation source (subscriber information or statistical information) of the expected values described above. Based on the "Expected UE Behaviour IE", the controller 230 determines whether or not to configure the extended DRX in the UE 100. For example, the controller 230 determines, for a non-moving UE 100, to configure the extended DRX, and transmits configuration information for the extended DRX to the UE 100.

The transmitter 120 transmits, to the UE 100, threshold value information for setting a threshold value in the UE 100. The threshold value includes a first threshold value described later. The threshold value may include a second threshold value described later. The threshold value information may be a value directly indicating the threshold value, or a difference value (offset value) of the threshold value with respect to a reference value.

In the first embodiment, the transmitter 120 includes the threshold value information in the configuration information of the extended DRX. FIG. 8 is a diagram illustrating the configuration information (DRX-Config-v13xx) of the extended DRX according to the first embodiment. As illustrated in FIG. 8, the "DRX-Config-v13xx" includes the threshold value information (Timer or Counter), in addition to the extended DRX cycle (extendedDRX-Cycle).

(Radio Terminal)

Figure 9:
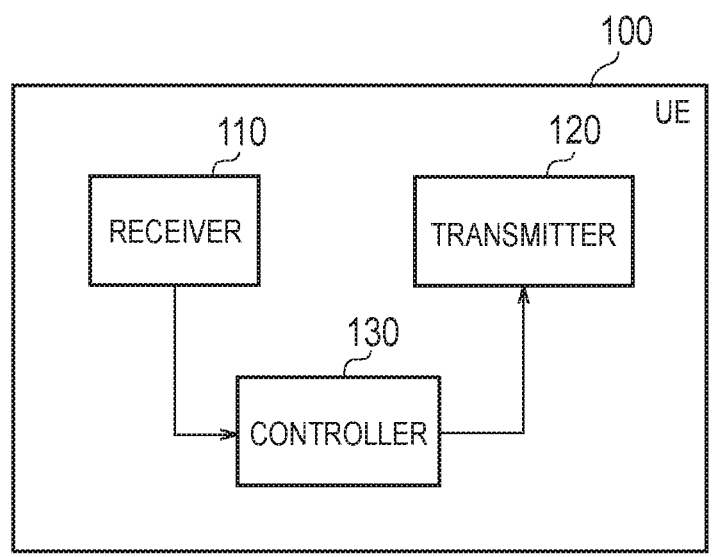
FIG. 9 is a block diagram of the UE.

The UE 100 (radio terminal) according to the first embodiment will be described below. FIG. 9 is a block diagram of a configuration of the UE 100. As illustrated in FIG. 9, the UE 100 includes a receiver 110, a transmitter 120, and a controller 130.

The receiver 110 performs various types of reception under the control of the controller 130. The receiver 110 includes an antenna and a receiving machine. The receiving machine converts a radio signal received by the antenna into a baseband signal (reception signal) and outputs it to the controller 130.

The transmitter 120 performs various types of transmission under the control of the controller 130. The transmitter 120 includes an antenna and a transmitting machine. The transmitting machine converts a baseband signal (transmission signal) output from the controller 130 into a radio signal and transmits it from the antenna.

The controller 130 performs various controls in the UE 100. The controller 130 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor may include a codec for encoding/decoding audio/video signals. The processor executes various processes described later and various communication protocols described above.

In the UE 100 thus configured, the receiver 110 receives, in the connected mode, the configuration information of the DRX (DRX-Config) and the configuration information of the extended DRX (DRX-Config-v13xx), from the eNB 200. The controller 130 saves the "DRX-Config" and the "DRX-Config-v13xx", and transitions to the DRX state of the connected mode based on the "DRX-Config" and the "DRX-Config-v13xx". The "DRX-Config" may include configuration information of the short DRX cycle (shortDRX-Cycle) or may not need to include the "shortDRX-Cycle".

The controller 130 sets the threshold value information (the first threshold value and the second threshold value), based on the threshold value information included in the "DRX-Config-v13xx". As described later, the controller 130 uses a timer or a counter to control the state transition from the long DRX state ST2 to the extended DRX state ST3. If a timer or a counter of count-up scheme is used, the threshold value is a value to be compared with the value of the timer or the counter. If a timer or a counter of count-down scheme is used, the threshold value is a value of the timer or the counter. Hereinafter, a case where the timer or the counter of count-up scheme is used, is mainly assumed.

The controller 130 discontinuously monitors, in the connected mode, a downlink control channel (PDCCH), in either the long DRX state ST2 or the extended DRX state ST3 having a DRX cycle longer than the long DRX state ST2 (see FIG. 6).

The controller 130 transitions from the long DRX state ST2 to the extended DRX state ST3, if, in the long DRX state ST2, a period during which a DRX cycles not receiving a control signal addressed to the UE continues or the number of times of the DRX cycles not receiving a control signal addressed to the UE exceeds the first threshold value.

Specifically, in a pattern 1 of the DRX state transition, the controller 130 measures, with the timer, the period during which the DRX cycle not receiving a control signal addressed to the UE continues, and if a timer value exceeds the first threshold value, the controller 130 transitions from the long DRX state ST2 to the extended DRX state ST3.

In a pattern 2 of the DRX state transition, the controller 130 measures, with the counter, the number of times of the DRX cycles not receiving a control signal addressed to the UE, and if a counter value exceeds the first threshold value, the controller 130 transitions from the long DRX state ST2 to the extended DRX state ST3. It is noted that the counter increments if there occurs the DRX cycle not continuously receiving a control signal addressed to the UE; however, once there occurs a DRX cycle receiving a control signal addressed to the UE, the current counter value may be reset.

(DRX State Transition According to First Embodiment)

Figure 10:
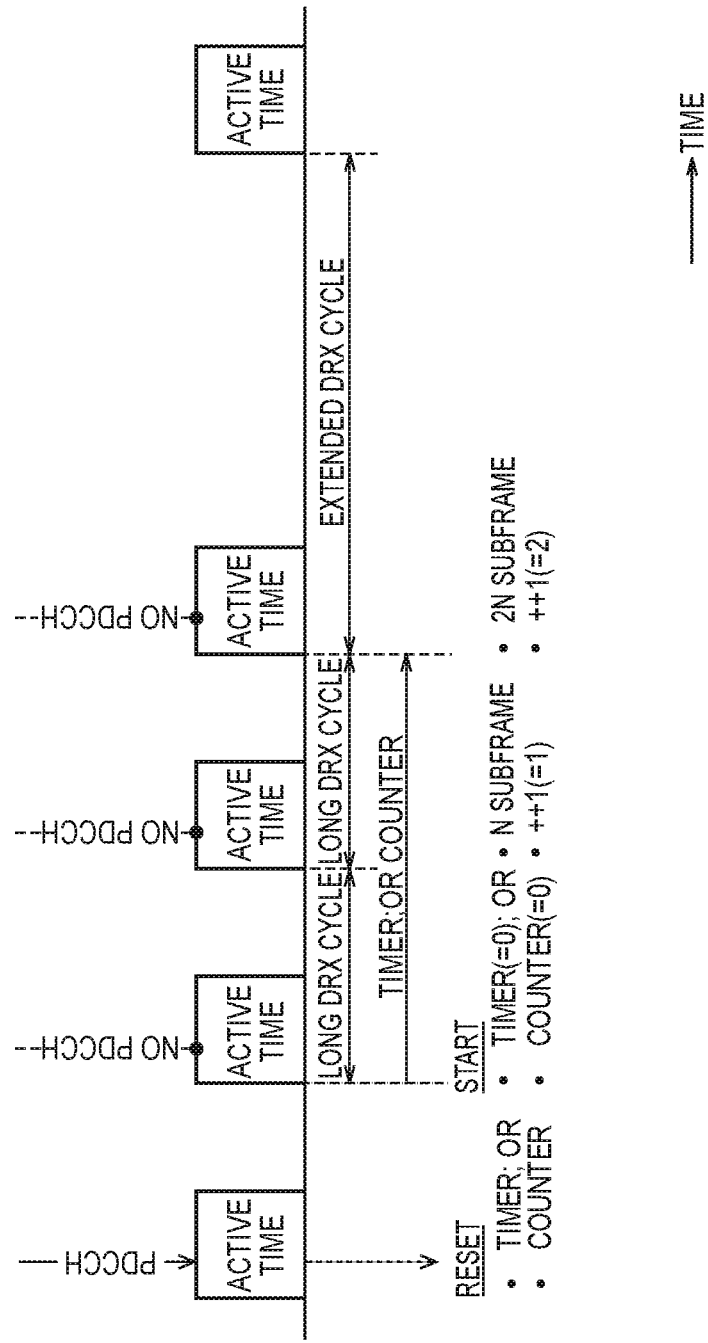
FIG. 10 is a diagram for describing DRX state transition according to the first embodiment.

FIG. 10 is a diagram for describing the DRX state transition according to the first embodiment.

(1) Pattern 1 of DRX State Transition

First, a pattern 1 of the DRX state transition according to the first embodiment will be described.

As illustrated in FIG. 10, in the long DRX state ST2, the controller 130 manages the timer. The controller 130 resets the timer, if, in an "On duration" (Active state) of the long DRX state ST2, a control signal addressed to the UE is received via the PDCCH. Meanwhile, in the "On duration" (Active state) of the long DRX state ST2, if the control signal addressed to the UE is not received via the PDCCH, the timer is started. The controller 130 operates, in the subsequent "On duration" (Active state), the timer until the control signal addressed to the UE is received via the PDCCH. Then, if the timer value exceeds the first threshold value (the number of N subframes or the number of N radio frames), the transition from the long DRX state ST2 to the extended DRX state ST3 occurs.

Furthermore, the controller 130 may manage the timer in a similar manner also in the extended DRX state ST3. The controller 130 resets the timer, if, in an "On duration" (Active state) of the extended DRX state ST3, the control signal addressed to the UE is received via the PDCCH. Meanwhile, in the "On duration" (Active state) of the extended DRX state ST3, if the control signal addressed to the UE is not received via the PDCCH, the timer is started. The controller 130 operates, in the subsequent "On duration" (Active state), the timer until the control signal addressed to the UE is received via the PDCCH. Then, if the timer value exceeds the second threshold value, the transition from the extended DRX state ST3 to the long DRX state ST2 occurs.

(2) Pattern 2 of DRX State Transition

Next, a pattern 2 of the DRX state transition according to the first embodiment will be described.

As illustrated in FIG. 10, in the long DRX state ST2, the controller 130 manages the counter. The controller 130 resets the counter, if, in the "On duration" (Active state) of the long DRX state ST2, the control signal addressed to the UE is received via the PDCCH. Meanwhile, in the "On duration" (Active state) of the long DRX state ST2, if the control signal addressed to the UE is not received via the PDCCH, the counter is incremented (that is, added by 1). The controller 130 increments, in the subsequent "On duration" (Active state), the counter for each "On duration" (Active state) until the control signal addressed to the UE is received via the PDCCH. Then, if the counter value exceeds the first threshold value, the transition from the long DRX state ST2 to the extended DRX state ST3 occurs.

Furthermore, the controller 130 may manage the counter in a similar manner also in the extended DRX state ST3. The controller 130 resets the counter, if, in the "On duration" (Active state) of the extended DRX state ST3, the control signal addressed to the UE is received via the PDCCH. Meanwhile, in the "On duration" (Active state) of the extended DRX state ST3, if the control signal addressed to the UE is not received via the PDCCH, the counter is incremented. The controller 130 increments, in the subsequent "On duration" (Active state), the counter for each "On duration" (Active state) until the control signal addressed to the UE is received via the PDCCH. Then, if the counter value exceeds the second threshold value, the transition from the extended DRX state ST3 to the long DRX state ST2 occurs.

As described above, according to the first embodiment, in the long DRX state ST2, if the control signal addressed to the UE is not received for a certain period of time (that is, if data addressed to the UE is not received for a certain period of time), it is possible to cause transition from the long DRX state ST2 to the extended DRX state ST3.

[Second Embodiment]

A second embodiment will be described with a particular focus on a difference from the first embodiment. The second embodiment is an embodiment in which the UE 100 is forcibly transitioned to the extended DRX state ST3 according to an instruction of the eNB 200.

The UE 100 according to the second embodiment discontinuously monitors, in the connected mode, a downlink control channel (PDCCH), in either the DRX state (the short DRX state ST1 or the long DRX state ST2) or the extended DRX state ST3 having a DRX cycle longer than the DRX state. The controller 130 of the UE 100 transitions from the DRX state to the extended DRX state ST3, if, in the DRX state, an MAC control element (eDRX Command MAC control element) to instruct the start of the extended DRX state ST3 is received from the eNB 200.

FIG. 11 is a diagram for describing the "eDRX Command MAC control element" according to the second embodiment.

As illustrated in FIG. 11, in the current 3GPP specification, a "MAC subheader" has a field of a "DRX Command" indicated by an index of "11110". The "DRX Command" is used by the eNB 200 for transitioning the UE 100 from a non-DRX state (a state where a DRX configuration is held but the DRX configuration is not active) to the DRX state. Furthermore, in the current specification, the "MAC subheader" reserves indexes from "01011" to "11010" as unused. For example, the reserved index of "11010" can be used as the "eDRX Command".

In the second embodiment, the controller 130 transitions from the long DRX state ST2 to the extended DRX state ST3, if, in the long DRX state ST2, the "eDRX Command MAC control element" is received from the eNB 200. Furthermore, if, in the long DRX state ST2, the "eDRX Command MAC control element" is received from the eNB 200, the controller 130 transitions to the extended DRX state ST3 without transitioning to the short DRX state ST1 even if having the configuration information for the short DRX state ST1 (shortDRX-Cycle).

The controller 130 transitions from a subframe in which the "eDRX Command MAC control element" is received from the eNB 200 to the extended DRX state ST3 according to extended DRX configuration information (DRX-Config-v13xx). Furthermore, the controller 130 stops the "On duration timer" if the "On duration timer" is operating (started) when the "eDRX Command MAC control element" is received from the eNB 200. Furthermore, the controller 130 stops the "drx-InactivityTimer" if the "drx-InactivityTimer" is operating (started) when the "eDRX Command MAC control element" is received from the eNB 200.

According to the second embodiment, it is possible to forcibly transition the UE 100 to the extended DRX state ST3 according to an instruction of the eNB 200.

[Third Embodiment]

A third embodiment will be described with a particular focus on a difference from the first embodiment.

The third embodiment is an embodiment in which the UE 100 is transitioned from the extended DRX state ST3 to the conventional DRX state.

Figure 12:
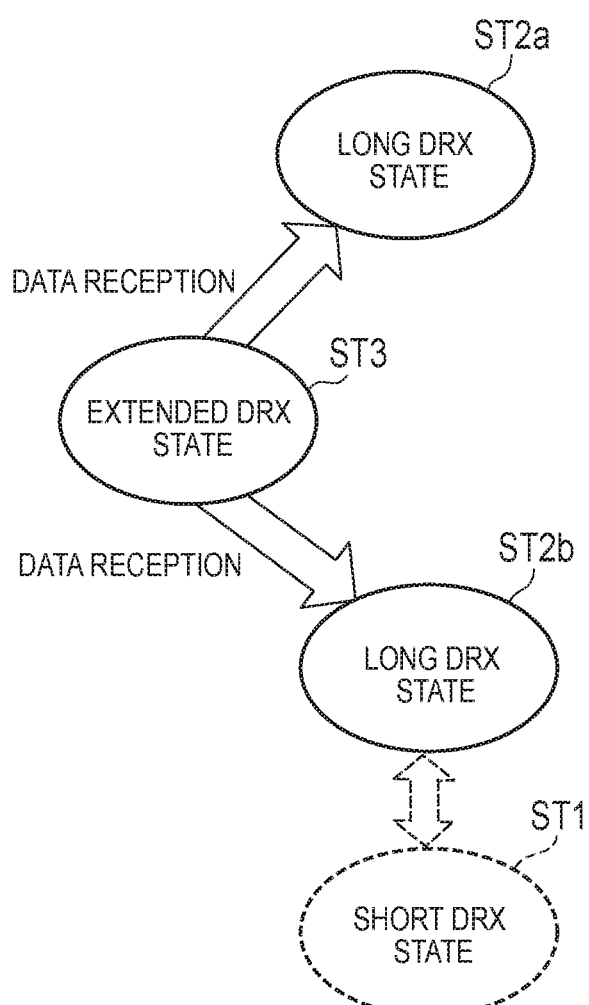
FIG. 12 is a state transition diagram illustrating DRX state transition according to a third embodiment.

FIG. 12 is a state transition diagram illustrating the DRX state transition according to the third embodiment.

As illustrated in FIG. 12, in the extended DRX state ST3, the controller 130 of the UE 100 transitions to the DRX state (conventional DRX state) upon data transmission to the eNB 200 or data reception from the eNB 200. The data reception means to receive the control signal addressed to the UE via the PDCCH, and receive data via the PDSCH. The data transmission means to transmit data via the PUSCH.

In the third embodiment, a DRX state applicable if having transitioned to the DRX state upon data transmission to the eNB 200 is different from a DRX state applicable if having transitioned to the DRX state upon data reception from the eNB 200.

If having transitioned to the conventional DRX state upon data reception, the controller 130 transitions to a long DRX state ST2a without transitioning to the short DRX state ST1, even if having the configuration information for the short DRX state ST1 (shortDRX-Cycle). That is, the long DRX state ST2a is a special long DRX state in which transition to the short DRX state ST1 is prohibited.

For the data reception, a case is assumed where data is singly received from the eNB 200. Therefore, by preventing the transition to the short DRX state ST1, power consumption can be reduced as compared with a case where the transition to the short DRX state ST1 is allowed.

Meanwhile, if having transitioned to the DRX state upon data transmission, the controller 130 transitions to a long DRX state ST2b that enables the transition to the short DRX state ST1 if the controller 130 holds the configuration information for the short DRX state ST1. That is, the long DRX state ST2b is a regular long DRX state in which the transition to the short DRX state ST1 is allowed. It is noted that, "transition to the DRX state upon data transmission" may refer to transition to the DRX state upon transmission of a scheduling request or random access preamble for data transmission.

For the data transmission, it is assumed that the UE 100 desires to communicate with the eNB 200 and receives data a plurality of number of times from the eNB 200. Therefore, by allowing the transition to the short DRX state ST1, it is possible to cope with relatively frequent communication.

[Fourth Embodiment]

A fourth embodiment will be described with a particular focus on a difference from the first embodiment.

In the fourth embodiment, a case is assumed where the UE 100 has the short DRX configuration information (shortDRX-Cycle), the long DRX configuration information (longDRX-Cycle), and the extended DRX configuration information (extendedDRX-Cycle).

The extended DRX is a special DRX different from the conventional DRX. It is preferable that the UE 100 in which such a special DRX is configured by the individual RRC message from the eNB 200 actively uses the extended DRX.

Figure 13:
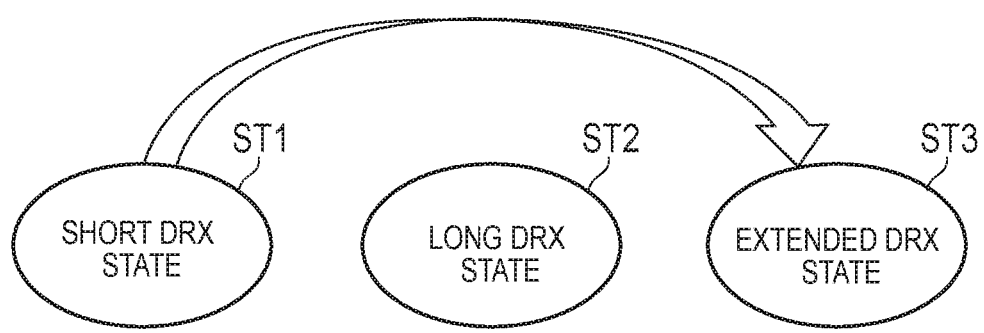
FIG. 13 is a state transition diagram illustrating DRX state transition according to a fourth embodiment.

FIG. 13 is a state transition diagram illustrating the DRX state transition according to the fourth embodiment.

As illustrated in FIG. 13, in the short DRX state ST1, the controller 130 of the UE 100 transitions from the short DRX state ST1 to the extended DRX state ST3, without transitioning from the short DRX state ST1 to the long DRX state ST2. In other words, in the state transition from the short DRX state ST1 to another DRX state, the controller 130 ignores the long DRX configuration information (longDRX-Cycle).

According to the fourth embodiment, it is possible to cause the UE 100 configured with the extended DRX to actively use the extended DRX.

[Fifth Embodiment]

A fifth embodiment will be described with a particular focus on a difference from the first embodiment.

In the fifth embodiment, a case is assumed where the UE 100 has the short DRX configuration information (shortDRX-Cycle), the long DRX configuration information (longDRX-Cycle), and the extended DRX configuration information (extendedDRX-Cycle).

The UE 100 in which the extended DRX is configured by the individual RRC message from the eNB 200 can be considered to perform machine-type communication (MTC). Furthermore, in the MTC, it is considered that the single communication is mainly employed. Therefore, it is not preferable from a view point of power consumption that such UE 100 transitions to the short DRX state ST1.

Figure 14:
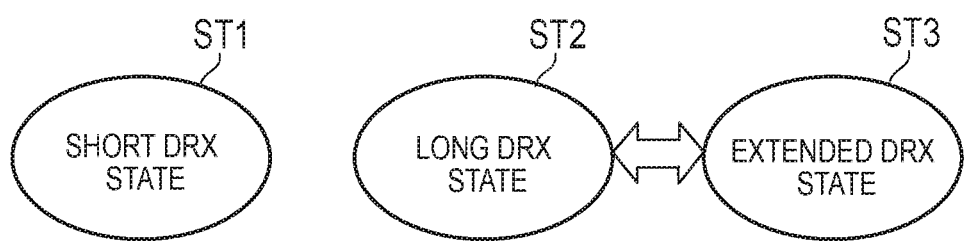
FIG. 14 is a state transition diagram illustrating DRX state transition according to a fifth embodiment.

FIG. 14 is a state transition diagram illustrating the DRX state transition according to the fifth embodiment.

As illustrated in FIG. 14, if the controller 130 of the UE 100 has both the configuration information for the extended DRX state ST3 (extendedDRX-Cycle) and the configuration information for the short DRX state ST1 (shortDRX-Cycle), the controller 130 of the UE 100 ignores the configuration information for the short DRX state ST1 (shortDRX-Cycle). That is, the UE 100 configured with the extended DRX ignores the "shortDRX-Cycle". As a result, the UE 100 configured with the extended DRX will perform the state transition only between the extended DRX state ST3 and the long DRX state ST2, even if having the "shortDRX-Cycle".

According to the fifth embodiment, it is possible to reduce power consumption in the UE 100 configured with the extended DRX.

[Other Embodiments]

In the above-described first embodiment, the state transition from the long DRX state ST2 to the extended DRX state ST3 has been described. However, the operation according to the first embodiment may be applied to the state transition from the short DRX state ST1 to the extended DRX state ST3.

In the above-described embodiment, the DRX in an idle mode was not particularly described. However, the operation according to the first embodiment may be applied to the DRX in the idle mode. In the idle mode, a paging cycle corresponds to the DRX cycle. After transitioning to the idle mode (after RRC Connection Release), if the timer or the counter expires, the UE 100 having configuration information of both the conventional paging cycle (conventional DRX cycle) and the extended paging cycle (extended DRX cycle) is started in accordance with the extended DRX cycle. That is, after transitioning to the idle mode, the conventional DRX state is maintained for a certain period of time, and when the certain period of time elapses, the transition to the extended DRX mode occurs.

In the above-described embodiment, the LTE system has been exemplified as the mobile communication system. However, the present invention is not limited to the LTE system. The present invention may be applied to systems other than the LTE system.

CROSS REFERENCE TO RELATED APPLICATIONS

The entire content of Japanese Patent Application No. 2015-38927 (filed on Feb. 27, 2015) is incorporated in the present specification by reference.

INDUSTRIAL APPLICABILITY

The present invention is useful in the field of communication.

The invention claimed is:

1. A radio terminal comprising:
   a controller containing at least one processor and at least one memory, and configured to execute processes of
      discontinuously monitoring, in a connected mode, a downlink control channel, in a short Discontinuous Reception (DRX) state, a long DRX state, and an extended DRX state, the longer DRX state having a DRX cycle longer than a DRX cycle of the short DRX state, the extended DRX state having a DRX cycle longer than the DRX cycle of the long DRX state;
      in the long DRX state, receiving a MAC control element to instruct transition to the extended DRX state from a base station; and
      in the long DRX state, transitioning from the long DRX state to the extended DRX state in response to receiving the MAC control element, even if the radio terminal has configuration information for the short DRX state.

2. A radio terminal comprising:
a controller containing at least one processor and at least one memory, and configured to execute processes of
discontinuously monitoring, in a connected mode, a downlink control channel, in a short Discontinuous Reception (DRX) state, a long DRX state, and an extended DRX state; and
transitioning, in the extended DRX state, to the short DRX state or the long DRX state upon data transmission to a base station or data reception from the base station, wherein
the longer DRX state having a DRX cycle longer than a DRX cycle of the short DRX state, the extended DRX state having a DRX cycle longer than the DRX cycle of the long DRX state,
a DRX state applicable when having transitioned upon the data transmission is different from a DRX state applicable when having transitioned upon the data reception,
the controller is configured to execute a process of prohibiting transition to the short DRX state even if the radio terminal has configuration information for the short DRX state, when having transitioned to the long DRX state upon the data reception.

3. A radio terminal comprising:
a controller containing at least one processor and at least one memory, and configured to execute processes of
discontinuously monitoring, in a connected mode, a downlink control channel, in a short Discontinuous Reception (DRX) state, a long DRX state, and an extended DRX state; and
transitioning, in the extended DRX state, to the short DRX state or the long DRX state upon data transmission to a base station or data reception from the base station, wherein
the longer DRX state having a DRX cycle longer than a DRX cycle of the short DRX state, the extended DRX state having a DRX cycle longer than the DRX cycle of the long DRX state,
a DRX state applicable when having transitioned upon the data transmission is different from a DRX state applicable when having transitioned upon the data reception,
the controller is configured to execute a process of enabling transition to the short DRX state if the radio terminal has the configuration information for the short DRX state, when having transitioned to the long DRX state upon the data transmission.

\* \* \* \* \*